US012214396B2

(12) United States Patent
Noh et al.

(10) Patent No.: US 12,214,396 B2
(45) Date of Patent: Feb. 4, 2025

(54) SEAM FORMING APPARATUS FOR ELBOW DUCT

(71) Applicants: Sung Keun Noh, Suwon-si (KR); Ok Tae Kim, Yongin-si (KR)

(72) Inventors: Sung Keun Noh, Suwon-si (KR); Ok Tae Kim, Yongin-si (KR); Dong Woo Kang, Hwaseong-si (KR)

(73) Assignees: Sung Keun Noh, Yongin-si (KR); Ok Tae Kim, Yongin-si (KR)

( * ) Notice: Subject to any disclaimer, the term of this patent is extended or adjusted under 35 U.S.C. 154(b) by 183 days.

(21) Appl. No.: 18/013,284

(22) PCT Filed: Apr. 15, 2021

(86) PCT No.: PCT/KR2021/004737
§ 371 (c)(1),
(2) Date: Dec. 28, 2022

(87) PCT Pub. No.: WO2022/025389
PCT Pub. Date: Feb. 3, 2022

(65) Prior Publication Data
US 2023/0249238 A1    Aug. 10, 2023

(30) Foreign Application Priority Data

Jul. 27, 2020    (KR) .......................... 10-2020-0093136

(51) Int. Cl.
*B21C 37/10*    (2006.01)
*B21D 19/04*    (2006.01)
*B21D 39/04*    (2006.01)

(52) U.S. Cl.
CPC .......... *B21C 37/101* (2013.01); *B21C 37/104* (2013.01); *B21D 19/046* (2013.01); *B21D 39/04* (2013.01)

(58) Field of Classification Search
CPC ...... B21D 19/04; B21D 19/046; B21D 39/04; B21C 37/101; B21C 37/104
See application file for complete search history.

(56) References Cited

U.S. PATENT DOCUMENTS

| 4,006,520 A | 2/1977 | Wachter |
| 7,797,805 B2 * | 9/2010 | Rieck ...................... B21C 37/28 |
| | | 72/71 |

(Continued)

FOREIGN PATENT DOCUMENTS

| EP | 1320698 B1 | 8/2004 |
| EP | 2 075 077 B1 | 4/2012 |

(Continued)

OTHER PUBLICATIONS

International Search Report for PCT/KR2021/004737, filed on Jul. 23, 2021.

*Primary Examiner* — Teresa M Ekiert
(74) *Attorney, Agent, or Firm* — Schmeiser, Olsen & Watts, LLP

(57) ABSTRACT

A device for forming seam of elbow duct is provided, and the device for forming seam of elbow duct that molds a lockseam by bending a flange of one pair of adjacent unit members, of a plurality of unit members constituting the elbow duct, including a base that supports a lower portion of the one pair of unit members; an elevating part that moves the base up and down; an angle adjustment part that adjusts a supporting angle of the base; a fixing chuck that supports an inner circumferential surface of a connecting portion of the one pair of unit members; a rotating part that rotates the fixing chuck; and a forming part that bends the flange of the one pair of unit members in a state where the flange is in contact to each other, to form the seam.

16 Claims, 16 Drawing Sheets

(56) References Cited

U.S. PATENT DOCUMENTS

2005/0028337  A1*   2/2005  Bota ..................... B21C 37/28
                                                            72/70
2010/0170318  A1    7/2010  Lawler
2017/0320119  A1   11/2017  Noh

FOREIGN PATENT DOCUMENTS

| JP | 3014486 U | 8/1995 |
|---|---|---|
| JP | H08-294738 A | 11/1996 |
| KR | 10-2003-0087619 A | 11/2003 |
| KR | 10-0846878 B1 | 7/2008 |
| KR | 10-1128336 B1 | 3/2012 |
| KR | 10-1616041 B1 | 4/2016 |
| KR | 10-2226505 B1 | 3/2021 |

* cited by examiner

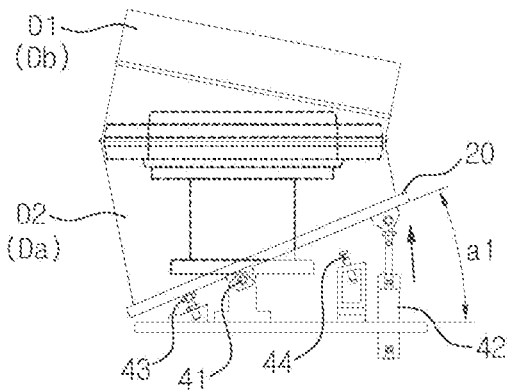
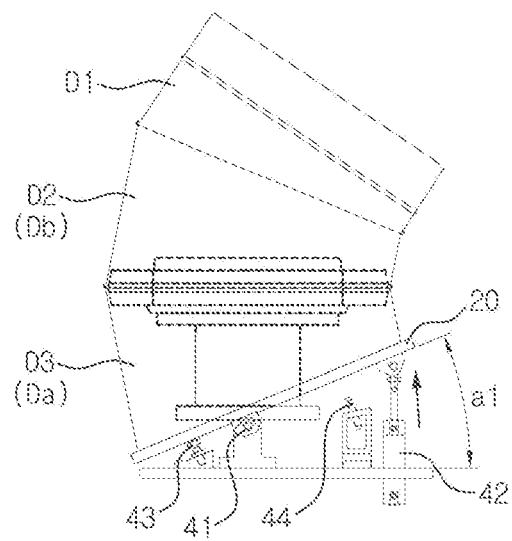
Fig. 16A    Fig. 16B
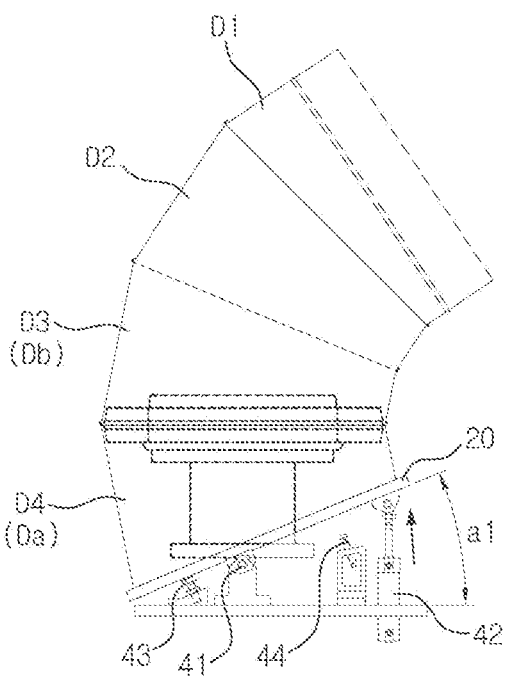
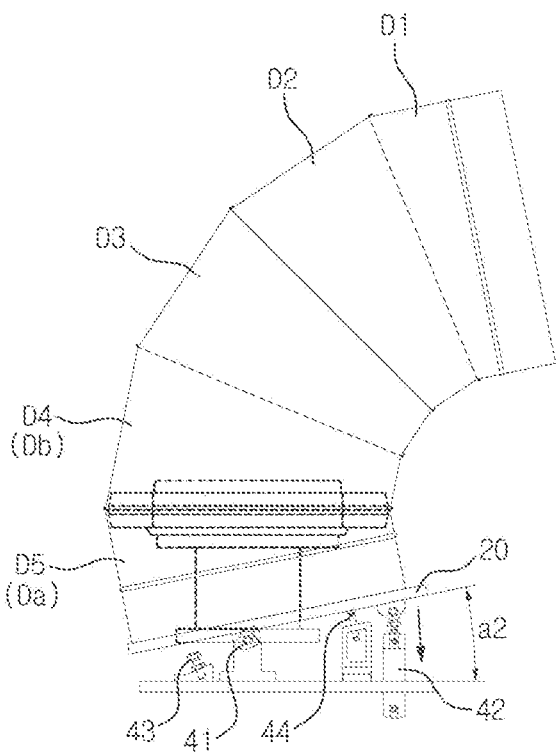
Fig. 16C    Fig. 16D

SEAM FORMING APPARATUS FOR ELBOW DUCT

CROSS-REFERENCE TO RELATED APPLICATIONS

This application claims priority to PCT Application No. PCT/KR2021/004737, having a filing date of Apr. 15, 2021, which is based on Korean Application No. 10-2020-0093136, having a filing date of Jul. 27, 2020, the entire contents both of which are hereby incorporated by reference.

FIELD OF TECHNOLOGY

The following relates to a device for forming seam of elbow duct, and more particularly, to a device for forming seam of elbow duct, that is capable of easily forming a lockseam on a connecting portion of a plurality of unit members constituting the elbow duct.

BACKGROUND

In general, as the design of a pipe becomes more and more complicated, a lot of bending inevitably occurs in connecting portions of the pipe. The reliability of an elbow pipe used in such a bent part of the pipe is also showing more and more importance in the efficiency of a pipe construction work.

However, in general, when manufacturing an elbow pipe, numerous connecting pipes need to be connected, and the parts where respective connecting pipes may be engaged are coupled by hitting using tools such as a hammer, thus leading to inevitable increase of manufacturing time and overcharge of cost of an elbow pipe, and at the same time, there is also a problem that mass production is difficult as only skilled workers have to manually manufacture it.

Thus, Korean Laid-open Patent No. 10-2003-0087619 disclosed a fold seam connecting part consisting of a first fold having the shape of a flange on a connecting portion of an elbow type duct consisting of a plurality of unit members, and a second fold surrounding an outer side of the dual fold.

However, although such a connecting part can secure a sealing force at an initial state, there is a problem that if the duct structure is twisted or bent by an external force applied to the duct, contact surfaces between the connecting parts may widen, thereby easily deteriorating the sealing force.

Further, in order to manufacture an elbow duct, it is necessary to repeat a process of forming a fold seam connecting part through the flange formed in each of the plurality of fragment pipes, but such a repeating process is not arranged on a straight line but refractively arranged along the shape of the elbow duct, and so it is becomes very difficult to work.

SUMMARY

An aspect relates to a device for forming seam of elbow duct that is capable of easily forming a lockseam on a connecting portion of a plurality of unit members constituting the elbow duct.

Further, another purpose of the present disclosure is to provide a device for forming seam of elbow duct, that is capable of easily forming a seam on a connecting portion of unit members having different angles of a lower supporting surface.

Further, another purpose of the present disclosure is to provide a device for forming seam of elbow duct, that is capable of forming a seam in a state in which an inner circumferential surface of a connecting portion of one pair of unit members is closely supported, thereby preventing the shape of the connecting portion from being deformed in the forming process of the seam.

The aforementioned purposes are achieved by the present disclosure, a device for forming seam of elbow duct, that molds a lockseam by bending a flange of one pair of adjacent unit members among a plurality of unit members constituting the elbow duct, including a base that supports a lower portion of the one pair of unit members; an elevating part that moves the base up and down; an angle adjustment part that adjusts a supporting angle of the base; a fixing chuck that supports an inner circumferential surface of a connecting portion of the one pair of unit members; a rotating part that rotates the fixing chuck; and a forming part that bends the flange of the one pair of unit members in a state where the flange is in contact to each other, to form the seam.

Here, in some embodiments the elevating part includes an elevating table that supports a lower portion of the base and an elevation driving part that moves the elevating table up and down.

Further, in some embodiments the elevation driving part includes a plurality of elevating shafts that are disposed to be parallel with a movement direction of the elevating table and that are fixed to a lower portion of the elevating table; a connecting shaft that is disposed in a direction intersecting the elevating shaft and that connects one pair of adjacent elevating shafts; and a driving motor for elevation that provides a rotation driving force to the connecting shaft, and a rack and a pinion are formed on a connecting portion of the connecting shaft and the elevating shaft, so that an axial direction position of the elevating shaft is adjusted by an axial rotation of the connecting shaft.

Further, in some embodiments the angle adjustment part includes a rotation axis that rotatably connects the elevating table and the base; and an interval adjustment part that connects the elevating table and one side of the base in a position distanced from the rotation axis, and that adjusts an interval between the elevating table and the base to adjust an angle of the base.

Further, in some embodiments the fixing chuck includes a chuck main body and a plurality of supporting members each of which is moveably disposed radially on the chuck main body, and on an outer circumferential surface of the supporting member, a supporting surface is formed that supports an inner circumferential surface of the connecting portion of the one pair of unit members.

Further, in some embodiments the supporting surface is made in a shape corresponding to the inner circumferential surface of the connection portion of the one pair of unit members.

Further, in some embodiments the supporting surface is assembled to be attachable/detachable on the supporting member.

Further, in some embodiments the fixing chuck further includes an elevating pin that is elevatably disposed at a center of the plurality of supporting members and that moves the supporting member in an expanding direction according to an elevation position.

Further, in some embodiments the fixing chuck further includes a spring member that is provided between the supporting member and the chuck main body and that elastically supports the supporting member in a contraction direction.

Further, in some embodiments on a plane surface of the supporting member, a guide groove is provided along a movement direction, and on an upper surface of the chuck main body, a guide projection is formed, to be inserted into the guide groove.

Further, in some embodiments the forming part includes a moving part that is disposed to be moveable in a direction approaching towards or distancing away from a center of the fixing chuck outside of the connecting portion of the one pair of unit members; a forward and backward driving part that moves the moving part forward and backward; and a forming roller that moves forward and backward together with the moving part on the moving part and that is supported to be axially rotatable.

Further, in some embodiments the forming part further includes a roller bracket that is disposed to be movable in a direction parallel with a movement direction of the moving part on the moving part in a state of supporting the forming roller; and an elastic member that is interposed between the moving part and the roller bracket and that elastically supports the roller bracket in a forward direction.

Further, in some embodiments the forming part includes a first forming part, a second forming part and a third forming part, that are disposed in plurality radially around the fixing chuck.

And in some embodiments the forming roller of the first forming part includes a first forming surface that forms a standing seam by bending an end of a first flange in a state where the first flange having ' — ' shape formed on a lower side edge of an upper unit member is seated on an upper side of a second flange having ' L ' shape formed on an upper side edge of a lower unit member.

And the forming roller of the second forming part includes a second forming surface that bends the seam formed by the first forming part and disposed in a horizontal direction to be inclined towards an outer surface of the duct.

And the forming roller of the third forming part includes a third forming surface that places the seam bent by the second forming part closely to the outer surface of the duct, to form a lock seam.

Further, in some embodiments the device for forming seam of elbow duct further includes a holder that rotatably supports the one pair of unit members.

Further, in some embodiments the holder is disposed on the moving part of the forming part, and disposed to be able to go forward and backward in a direction towards the fixing chuck on the moving part.

Further, in some embodiments a roller is disposed on a front end of the holder.

According to the present disclosure, there is an effect of providing a device for forming seam of elbow duct, that is capable of easily forming a lockseam on a connecting portion of a plurality of unit members constituting the elbow duct.

Further, there is an effect of providing a device for forming seam of elbow duct, that is capable of easily forming a seam on a connecting portion of unit members having different angles of a lower supporting surface.

Further, there is an effect of providing a device for forming seam of elbow duct, that is capable of forming a seam in a state in which an inner circumferential surface of a connecting portion of one pair of unit members is closely supported, thereby preventing the shape of the connecting portion from being deformed in the forming process of the seam.

BRIEF DESCRIPTION

Some of the embodiments will be described in detail, with references to the following Figures, wherein like designations denote like members, wherein:

FIG. 16A is a view showing a process of manufacturing an elbow-type duct through a device for forming seam of elbow duct of the present disclosure;

FIG. 16B is a view showing a process of manufacturing an elbow-type duct through a device for forming seam of elbow duct of the present disclosure;

FIG. 16C is a view showing a process of manufacturing an elbow-type duct through a device for forming seam of elbow duct of the present disclosure; and FIG. 16D is a view showing a process of manufacturing an elbow-type duct through a device for forming seam of elbow duct of the present disclosure.

REFERENCE NUMERALS

10: DEVICE MAIN BODY, 11: FIRST TABLE, 12: SECOND TABLE, 20: BASE, 21: RING-TYPE SUPPORTER, 30: ELEVATING PART, 31: ELEVATING TABLE, 32: ELEVATING SHAFT, 32A: RACK, 33: CONNECTING SHAFT, 33A: PINION, 34: DRIVING MOTOR FOR ELEVATION, 35: HOUSING, 40: ANGLE ADJUSTMENT PART, 41: ROTATION SHAFT, 42: DRIVING PART, 43: FIRST STOPPER, 40: ANGLE ADJUSTMENT PART, 41: ROTATION SHAFT, 42: DRIVING PART, 43: FIRST STOPPER, 44: SECOND STOPPER, 50: FIXING CHUCK,

51: CHUCK MAIN BODY, 51A: MOVING HOLE, 51A: GUIDE PROJECTION, 52: SUPPORTING MEMBER, 52A: GUIDE GROOVE, 52B: SUPPORTING SURFACE, 53: ELEVATING PIN, 54: COVER, 55: SPACER, 56: SLIP PAD, 57: SPRING MEMBER, 60: ROTATING PART, 61: HOLLOW TUBE, 62: ROTATION DRIVING PART, 70A: FIRST FORMING PART, 70B: SECOND FORMING PART, 70C: THIRD FORMING PART, 71: MOVING PART, 72: FORWARD AND BACKWARD DRIVING PART, 73: ROLLER BRACKET, 74: FORMING ROLLER, 74A: FIRST FORMING ROLLER, 74A1: FIRST FORMING SURFACE, 74B: SECOND FORMING ROLLER, 74B1: SECOND FORMING SURFACE, 74C: THIRD FORMING ROLLER, 74C1: THIRD FORMING SURFACE, 75: ELASTIC MEMBER, 80: HOLDER, 81: ROLLER, DA: LOWER UNIT MEMBER, DB: UPPER UNIT MEMBER, F1: FIRST FLANGE, F2: SECOND FLANGE

DETAILED DESCRIPTION

Hereinbelow, with reference to the attached drawings, a device for forming seam of elbow duct according to a first embodiment of the present disclosure will be described in detail.

Figure 1:
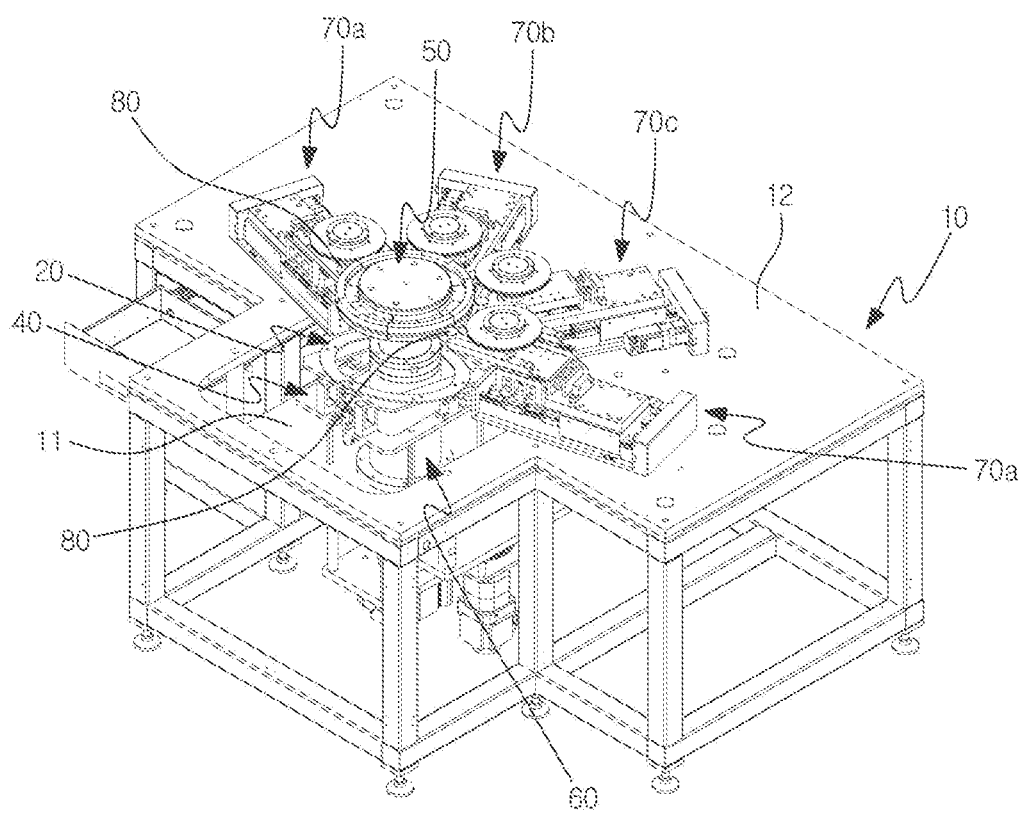
FIG. 1 is a perspective view of a device for forming seam of elbow duct of the present disclosure.
Figure 2:
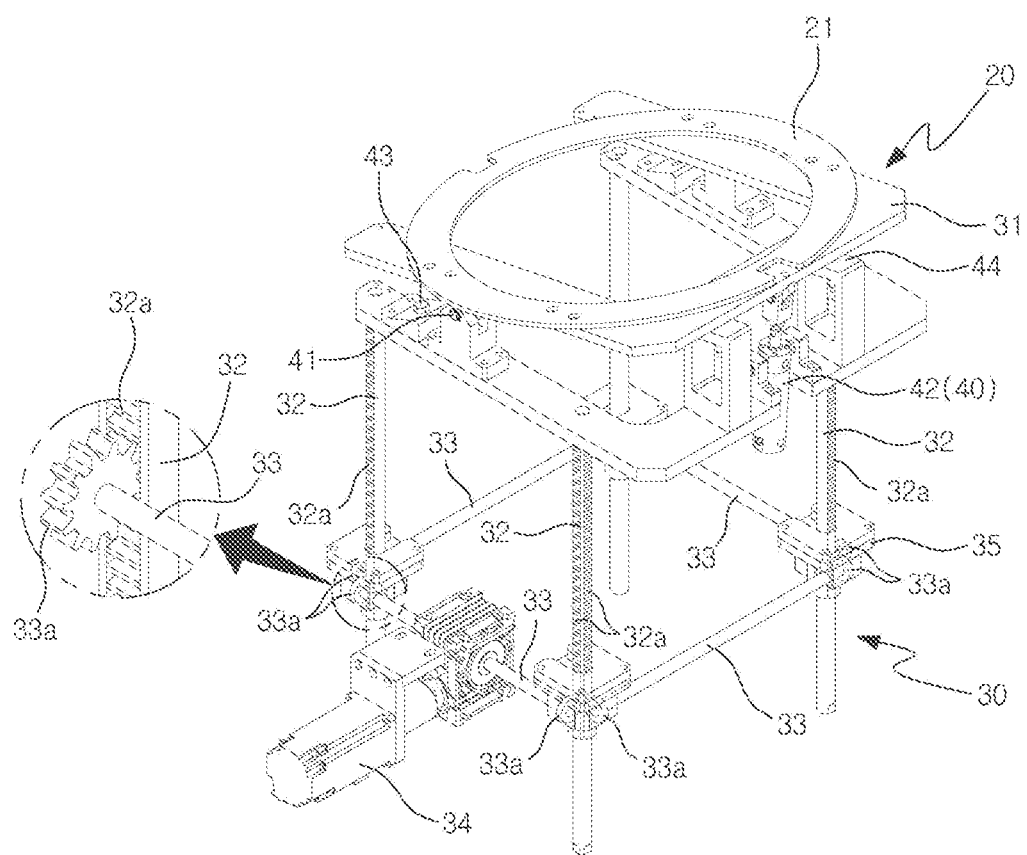
FIG. 2 is an excerpt perspective view of an elevating part and an angle adjustment part of a device for forming seam of elbow duct of the present disclosure.
Figure 3:
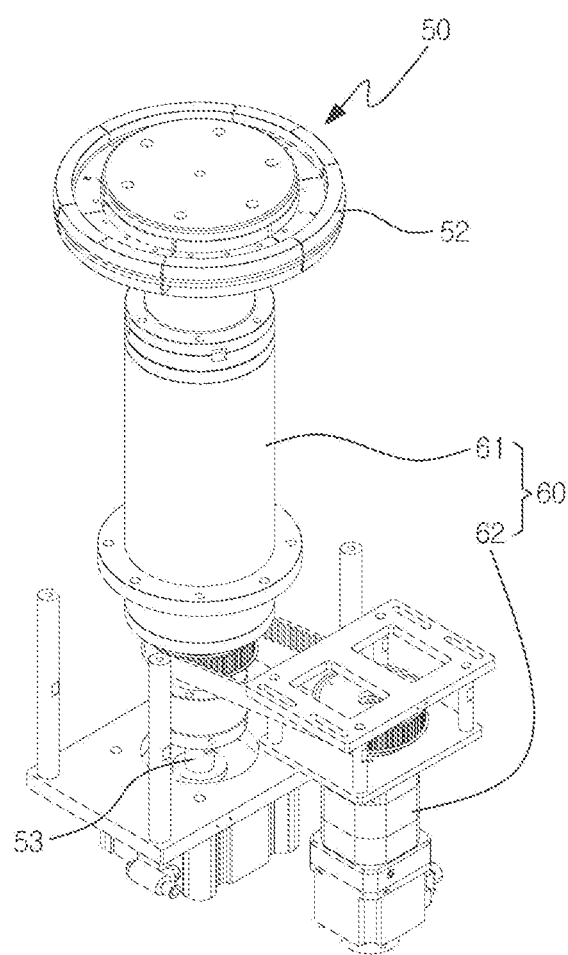
FIG. 3 is an excerpt perspective view of a fixing chuck and a rotating part of a device for forming seam of elbow duct of the present disclosure.
Figure 4:
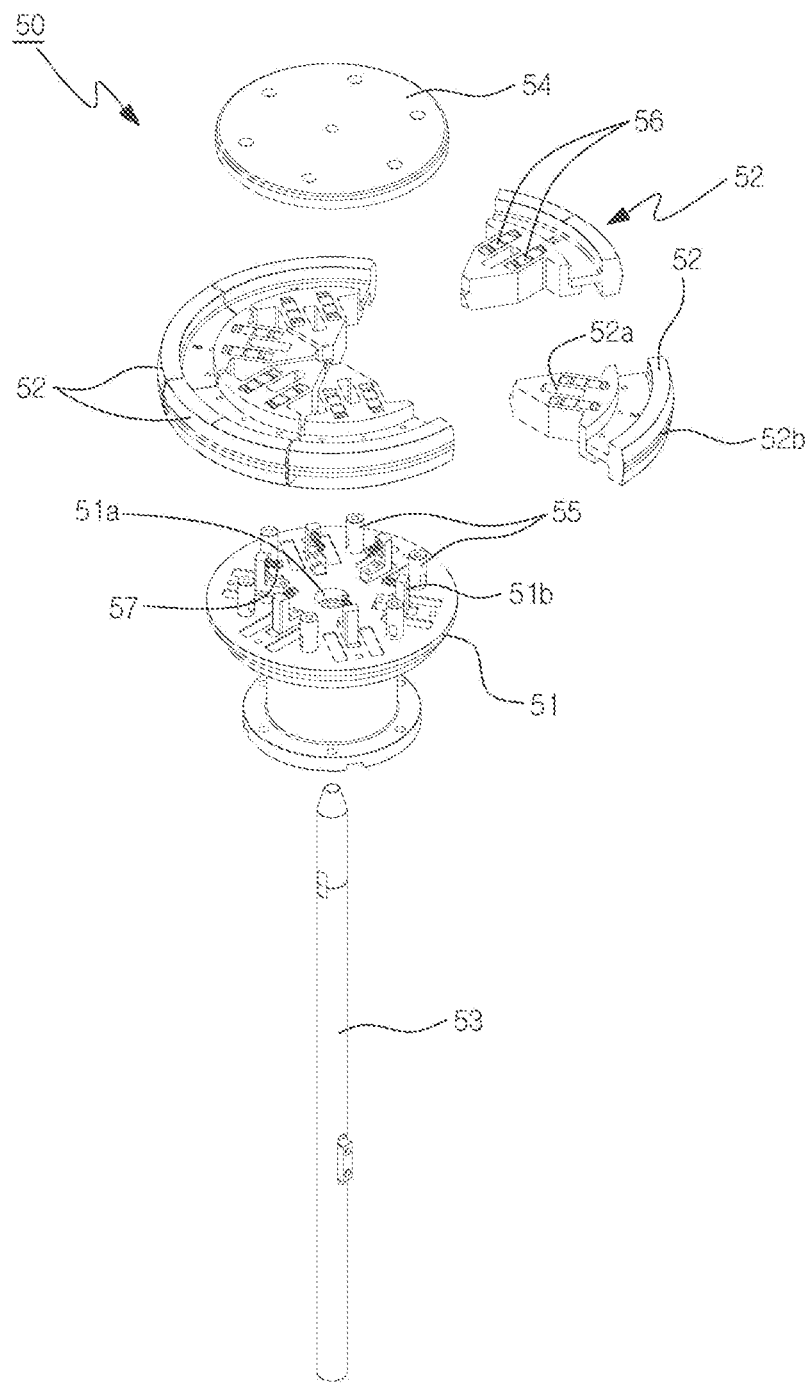
FIG. 4 is an exploded perspective view of a fixing chuck of a device for forming seam of elbow duct of the present disclosure.
Figure 5:
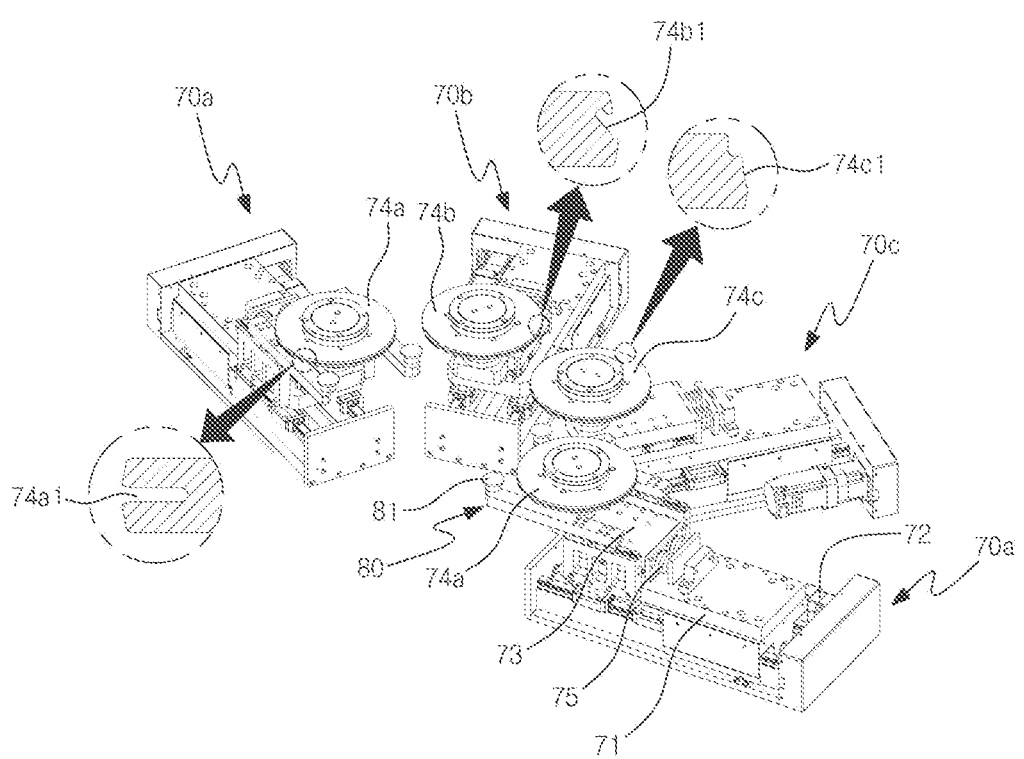
FIG. 5 is an excerpt perspective view of a forming part and a holder of a device for forming seam of elbow duct of the present disclosure.
Figure 6:
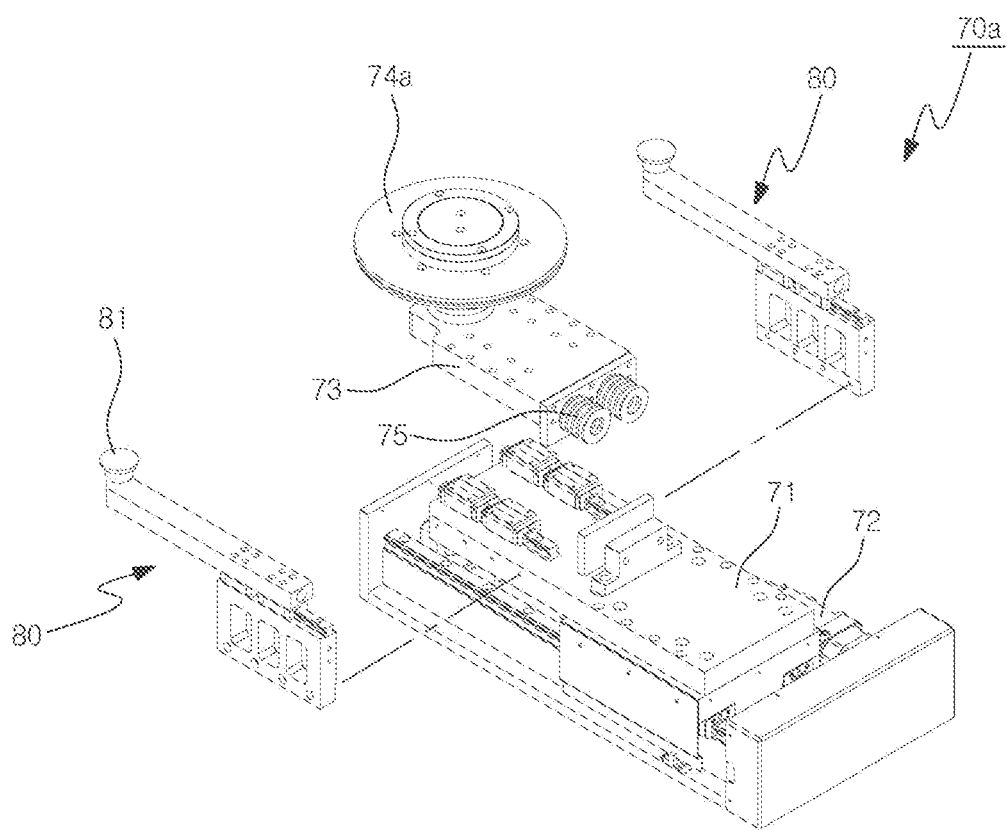
FIG. 6 is an exploded perspective view of a forming part of a device for forming seam of elbow duct of the present disclosure.

Of the attached drawings, FIG. 1 is a perspective view of a device for forming seam of elbow duct of the present disclosure, FIG. 2 is an excerpt perspective view of an elevating part and an angle adjustment part of a device for forming seam of elbow duct of the present disclosure, FIG. 3 is an excerpt perspective view of a fixing chuck and a rotating part of a device for forming seam of elbow duct of the present disclosure, FIG. 4 is an exploded perspective view of a fixing chuck of a device for forming seam of elbow duct of the present disclosure, FIG. 5 is an excerpt perspective view of a forming part and a holder of a device for forming seam of elbow duct of the present disclosure, and FIG. 6 is an exploded perspective view of a forming part of a device for forming seam of elbow duct of the present disclosure.

The device for forming seam of elbow duct of the present disclosure as illustrated in the aforementioned drawings is capable of forming a first flange F1 and a second flange F2 formed on one pair of adjacent unit members Da and Db among a plurality of unit members constituting an elbow duct, in a lockseam form, to improve sealing power and coupling power, and largely includes a device main body 10, a base 20, an elevating part 30, an angle adjustment part 40, a fixing chuck 50, a rotating part 60, a forming part and a holder 80.

The device main body 10 may include the elevating part 30 supporting a lower portion of the base 20, a first table 11 supporting the fixing chuck 50 and the rotating part 60, and a second table 12 supporting the forming part, and on a plane surface of the second table 12, an opening may be formed, and the first table 11 may be connected with the second table 12 at a lower side of the opening.

The base 20 is for guiding an assembly position of the one par of unit members Da and Db so that a connecting portion of the one pair of unit members Da and Db can be positioned between the fixing chuck 50 and the forming part, and the base 20 may include a ring-type support 21 that can support a lower end of the lower unit member Da, of the one pair of unit members Da and Db. The ring-type support 21 is provided in a plurality of various sizes, and be composed to be selectively applied according to the standard of the duct that is the subject of the work.

The elevating part 30 is for moving the base 20 up and down on the first table 11, and includes an elevating table 31 for supporting a lower portion of the base 20, and an elevation driving part 42 for moving the elevating table 31 up and down.

The elevation driving part 42 includes a plurality of elevating shafts 32 that are disposed to be moveable along a movement direction of the elevating table 31 on the first table 11 and that has a top end fixed below the elevating table 31, a plurality of connecting shafts 33 that are disposed in a direction intersecting the elevating shaft 32 and that connects each of the one pair of adjacent elevating shafts 32, and a driving motor for elevation 34 that provides a rotation driving force to one of the plurality of connecting shafts 33. Further, on a connecting portion of the connecting shaft 33 and the elevating shaft 32, a rack 32*a* and a pinion 33*a* are each formed, and thus by an axial rotation of the connecting shaft 33, an axial direction position of the elevating shaft 32 may be adjusted. Further, the elevating part 30 may further include a housing 35 that surrounds the connecting portion of the connecting shaft 33 and the elevating shaft 32 and that supports the axial position of each of the connecting shaft 33 and the elevating shaft 32.

Accordingly, in a state elevated by the elevating part 30, the base 20 may support the lower unit member Da, of the one pair of unit members Da and Db stacked up and down, to guide an assembly position of the one pair of unit members Da and Db, and after the lower unit member Da is supported in a rotatable state by the holder 80, the base 20 is descended by the elevating part 30. Accordingly, the base 20 and the lower unit member Da may be prevented from interfering with each other in a process where the lower unit member Da rotates in order to mold a lockseam. That is, in some embodiments a position the base 20 is descended by the elevating part 30 is set as a position that can sufficiently deviate from a rotation region of the lower unit member Da.

According to this embodiment, the elbow duct is composed of a plurality of unit members D1, D2, D3, D4 and D5, and the plurality of unit members D1, D2, D3, D4 and D5, may be divided into end unit members D1 and D5 positioned at both ends, and intermediate unit members D2, D3 and D4 positioned between the both ends. Here, a cut surface corresponding to a connecting portion of the plurality of unit members D1, D2, D3, D4 and D5 is designed to have an angle between them that is not perpendicular to a central axial line of each unit member, and an outer cut surface of the end unit member D1 and D5 is designed to be perpendicular to the central axial line of each unit member. That is, the angle adjustment part 40 is composed to be able to adjust the base 20 that guides the assembly position of the lower unit member Da to a first supporting angle a1 when the intermediate unit member D2, D3 and D4 is disposed as the lower unit member Da, and to adjust the base 20 to a second supporting angle a2 that is different from the first supporting angle when the end unit member is disposed as the lower unit member Da. (refer to FIG. 16)

Such an angle adjustment part 40 may include a rotation axis 41 that rotatably connects the elevating table 31 and the base 20, and an interval adjustment part that connects the elevating table 31 and one side of the base 20 at a position distanced from the rotation axis 41, and that adjusts an interval between the base 20 and the elevating table 31 to adjust the angle of the base 20.

Meanwhile, the interval adjustment part may include a driving part 42 that connects the base 20 and one side of the elevating table 31 and that extends and contracts so that the connection length can be adjusted; a first stopper 43 that is disposed at one side of the elevating table 31 with respect to the rotation axis 41 and that comes in contact with the base 20 when the driving part 42 has extended, to guide the first supporting angle of the base 20; and a second stopper 44 that is disposed at the other side of the elevating table 31 with respect to the rotation axis 41 and that comes in contact with the base 20 when the driving part 42 has contracted, to guide the second supporting angle of the base 20. Further, since the first supporting angle and the second supporting angle may be changed according to the standard of the duct, such that the first stopper 43 and the second stopper 44 are composed to be able to control the supporting angle of the base 20 according to the standard of the duct. For example, the first stopper 43 and the second stopper 44 may be composed to be screwed onto the elevating table 31 to adjust the length protruding towards the base 20.

The fixing chuck 50 is for supporting the inner circumferential surface of the connecting portion of the one pair of unit members Da and Db, and the fixing chuck 50 includes a chuck main body 51 having a moving hole 51a in its center in a vertical direction, a plurality of supporting members 52 each of which is moveably disposed radially around the moving hole 51a on the chuck main body 51 and has, on its outer circumferential surface, a supporting surface 52b that can support the inner circumferential surface of the connecting portion of the one pair of unit members Da and Db, an elevating pin 53 that is disposed such that it is elevatable at a position corresponding to the moving hole 51a and that can be inserted inside the moving hole 51a to move the supporting member 52 to an expandable direction, a cover 54 that is disposed with a distance at an upper side of the chuck main body 51 and that covers an upper side of the plurality of supporting members 52, and a spacer 55 that maintains the interval between the cover 54 and the chuck main body 51.

On a plane surface of the supporting member 52, a guide groove 52a is provided along the movement direction, and on an upper surface of the chuck main body 51, a guide projection 51b is formed that may be inserted inside the guide groove 52a, and between the guide projection 51b and the guide groove 52a, a spring member 57 may be provided to elastically support the supporting member 52 in a contraction direction. Accordingly, when the elevating pin 53 ascends and the supporting member 52 moves in an expansion direction, the supporting surface 52b may support the inner circumferential surface of the connecting portion of the one pair of unit members Da and Db and the spring member 57 may be compressed at the same time, and when the elevating pin 53 descends, by the elastic restoring force of the spring member 57, the supporting member 52 may move in a contraction direction, so that the supporting surface 52b is distanced from the inner circumferential surface of the connecting portion of the one pair of unit members Da and Db.

In addition, the fixed chuck 50 further includes a slip pad 56 interposed between the chuck body 51 and the cover 54 on the upper and lower surfaces of the support member 52, respectively, and by such a slip pad 56, the supporting member 52 is prevented from directly contacting the chuck main body 51 and the cover 54 and the moving friction is minimized, thereby allowing each of the numerous supporting members 52 to smoothly move radially according to the elevation position of the elevating pin 53.

Further, in some embodiments that an upper end edge of the elevating pin 53 is made in a slope surface, and the portion that contacts the upper end of the elevating pin 53 of the supporting member 52 is made in a slope surface having an inclination corresponding to the slope surface of the elevating pin 53.

The supporting member 52 is formed in a fan shape, and multiple supporting members 52 are disposed around the moving hole 51a of the chuck main body 51 to form a circular disc as a whole.

Here, since a central axis of the connecting portion of the one pair of unit members Da and Db constituting the elbow duct forms a predetermined angle between them, in 3 o'clock direction and 9 o'clock direction with respect to the center of the connecting portion, the inner circumferential surface of the one pair of unit members Da and Db are parallel to each other, and in 6 o'clock direction, the angle between the inner circumferential surface of the one pair of unit members Da and Db consists of a right angle that is greater than 180 degrees, and in 12 o'clock direction, the angle between the inner circumferential surface of the one pair of unit members Da and Db consists of an obtuse angle that is smaller than 180 degrees. Therefore, the supporting surface 52b is formed in a shape corresponding to the shape of the inner circumferential surface of the connecting portion of the one pair of unit members Da and Db, and may be assembled to be attachable/detachable to/from the supporting member 52. Accordingly, since it is possible to provide a supporting surface 52b that corresponds to a duct of various standards, and select a supporting surface 52b that corresponds to the desired standard duct and apply it to the supporting member 52, it is possible to manufacture an elbow duct of various standards using one device.

The entire outer edge shape of the plurality of supporting members 52 is formed to correspond to the cross-sectional shape of the connecting portion of the one pair of unit members Da and Db, so that when the one pair of unit members Da and Db are gripped using the fixing chuck 50, the cross-sectional shape of the connecting portion of the one pair of unit members Da and Db can be prevented from being deformed.

Generally, the shape of the inner circumferential surface of the connecting portion of the one pair of adjacent unit members Da and Db, of the plurality of unit members constituting the elbow duct, is composed to have, based on a central point of the connecting portion, a between angle of 180 degrees in 3 o'clock direction and 9 o'clock direction, and a between angle of a right angle (angle greater than 180 degrees) in 12 o'clock direction, and a between angle of an obtuse angle (angle smaller than 180 degrees) in 6 o'clock direction, and such a shape to gradually be deformed in an intermediate region.

Therefore, by forming the shape of the supporting surface 52a disposed at an outer side of the plurality of supporting members 52 to correspond to the shape of the inner circumferential surface of the connecting portion of the one pair of unit members Da and Db, it is possible to prevent the shape of the inner circumferential surface of the connecting portion of the one pair of unit members Da and Db from being deformed in a process of bending a first flange F1 and A second flange F2 to mold a seam.

Meanwhile, at a lower end of the elevating pin 53, a driving part 42 may be disposed that can provide the driving force for elevation of the elevating pin 53, and the driving part 42 may be made in a form that can be extended and contracted, such as an air cylinder.

The rotating part 60 is for rotating the fixing chuck 50, and is provided with a hollow part that can accommodate the elevating pin 53 therein in a moveable state along a longitudinal direction, and includes a shaft 61 that may be fixed at a lower portion of the fixing chuck 50, and a rotation driving part 62 for axially rotating the shaft 61. The rotation driving part 62 may consist of a driving motor and a power transmission part, and the power transmission part may consist of a belt and a pulley. Meanwhile, the shaft 61 may be disposed on coaxially with the elevating pin 53, and for this purpose, the shaft 61 may be made in the form of a hollow pipe capable of accommodating the elevating pin in an internal space.

The forming part is for bending and forming in the form of a lockseam in a state where the first flange F1 of the lower unit member Da and the second flange F2 of the upper unit member Db are in contact to each other. The forming part includes a moving part 71 disposed to be moveable in a direction towards a center of the fixing chuck 50 on a plane, a forward and backward driving part 72 for moving the moving part 71 forward and backward, a roller bracket 73 that is supported to be moveable in a direction parallel to the movement direction of the moving part 71 on the moving part 71, a forming roller that is axially rotatably disposed at a front end of the roller bracket 73, and an elastic member 75 that is interposed between the moving part 71 and the roller bracket 73 and that elastically supports the roller bracket 73 in a forward direction.

The forward and backward driving part 72 may include a driving motor, a ball screw that may be rotated by the driving motor, and a ball nut that may be fixed to the moving part 71 and that may be engaged with the ball screw, and the ball screw may be connected with the driving motor through the belt and pulley, to receive the driving force. Further, the moving part 71 and the roller bracket 73 may each be guided in a linear reciprocating motion by an LM guide and the like.

In this embodiment, the forming part is provided in plurality, and the plurality of forming parts are disposed radially around the fixing chuck 50, and are composed to bend the first flange F1 of the lower unit member Da and the second flange F2 of the upper unit member Db stepwise, to mold in the form of a lockseam.

That is, according to this embodiment, the forming part may consist of a first forming part 70a having a first forming roller 74a for bending an end of a first flange F1 to form a standing seam, in a state where a second flange F2 of ' — ' shape is seated on an upper side of a first flange F1 of ' ㄴ ' shape, a second forming part 70b having a second forming roller 74b for bending the seam, that is primarily formed by the first forming roller 74a and disposed in a horizontal direction, to be inclined towards an outer surface of the duct, and a third forming part 70c having a third forming roller 74c for placing the seam that is upwardly bent by the second forming roller 74b to closely contact the outer surface of the duct, to form a lockseam.

Here, the first forming roller 74a is made to have a form in which a first forming surface 74a1 is recessed in a horizontal direction at a center of an outer circumferential surface, and in a process where the first forming roller 74a goes forward towards the fixing chuck 50, an end of the first flange F1 is bent in the form of surrounding the second flange F2, thereby forming the standing seam.

Further, the second forming roller 74b is made in a recessed form such that a second forming surface 74b1 is disposed in an upper direction inclined by about 45 degrees at a center of an outer circumferential surface, and in a process where the second forming roller 74b goes forward towards the fixing chuck 50, the standing seam may be bent in an upper direction along the second forming surface 74b1.

Further, the third forming roller 74c has a third forming surface 74c1 on an outer circumferential surface, and in a process in which the third forming roller 74c goes forward towards the fixing chuck 50, the upwardly bent seam is placed in close contact to the outer surface of the upper unit member Db by the third forming surface 74c1 of the second forming roller 74b, thereby completing the lockseam.

Meanwhile, the connecting portion of the lower unit member Da and the upper unit member Db has an elliptical cross-sectional shape, and here the forming roller is elastically supported by an elastic member 75, and molds the seam in a state of being in close contact along the outer circumferential surface of the connecting portion while going forward and backward within an elastic range of the elastic member 75, thus it is possible to prevent distortion of the connecting portion or deterioration of the forming quality of the seam.

Meanwhile, the standing seam has a large frictional resistance during forming, and thus an eccentric load is applied to the rotating unit member, which causes the problem where the first flange F1 and the second flange F2 of the one pair of unit members Da and Db being separated from the first forming surface 74a1 of the first forming roller 74a. In this embodiment, in order to solve this problem, the first forming part 70a is provided in plurality, and are disposed in a relatively symmetrical form at both sides of the one pair of unit members Da and Db. That is, if the standing seam is formed simultaneously at both sides of the connecting portion of the one pair of unit members Da and Db, eccentric load does not occur or does not act significantly when the one pair of unit Da and Db rotate, making it possible to mold large standing seams having large frictional resistance stably.

The holder 80 can support the first flange F1 of the lower unit member Da on the second table 12 of the device main body 10, and the holder 80 may be disposed on the moving part of the first forming part 70a, and since the holder 80 is disposed such that it can go forward and backward in a direction facing towards the fixing chuck 50 on the moving part 71, the position of the holder 80 can be adjusted according to the standard of the duct that is the subject of work, and the state of supporting the first flange F1 can be maintained in the process of forwarding and backwarding the forming roller. Meanwhile, at a front end of the holder 80, a roller 80 may be disposed, that freely rotates while supporting the unit member in order to minimize contact friction with the duct.

In this embodiment, it was exemplified that the holder 80 is provided at both sides of the plurality of first forming parts 70a, respectively, but besides this, it is possible to implement various types of modifications that can stably support the rotation of the unit member on the second table 11. For example, even when manufacturing a large elbow duct, it will be desirable to compose the number of the holder 80 to increase or decrease according to the diameter of the duct that is the subject of work so as to stably support the rotation of the unit member.

From now on, an operation of a first embodiment of a device for forming seam of elbow duct described above will be described.

Figure 7:
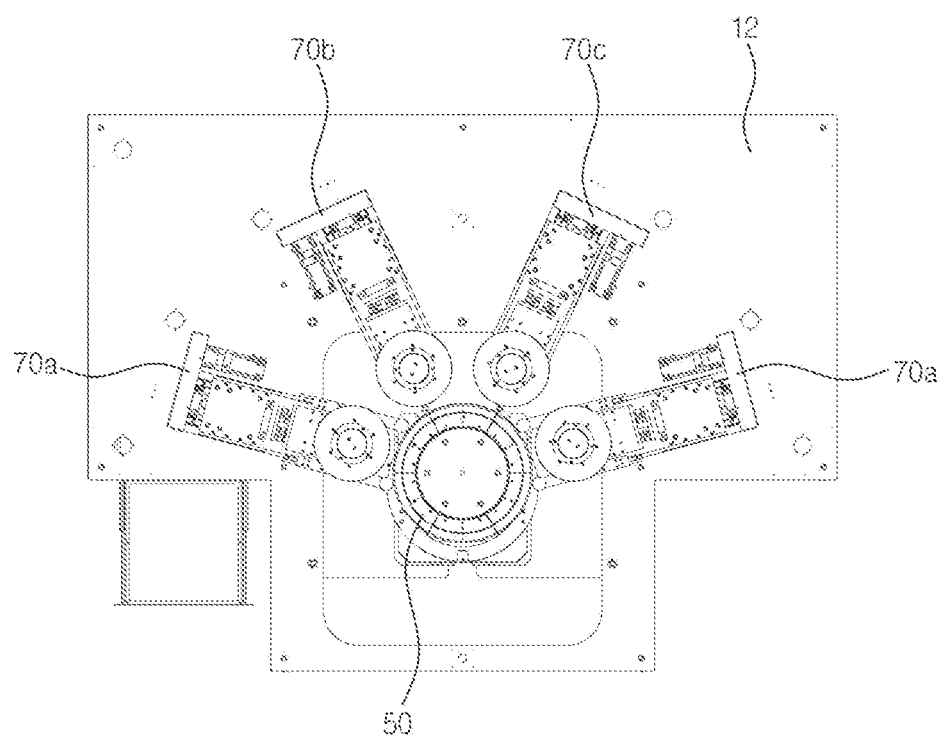
FIG. 7 is a plane view of a device for forming seam of elbow duct of the present disclosure.
Figure 8:
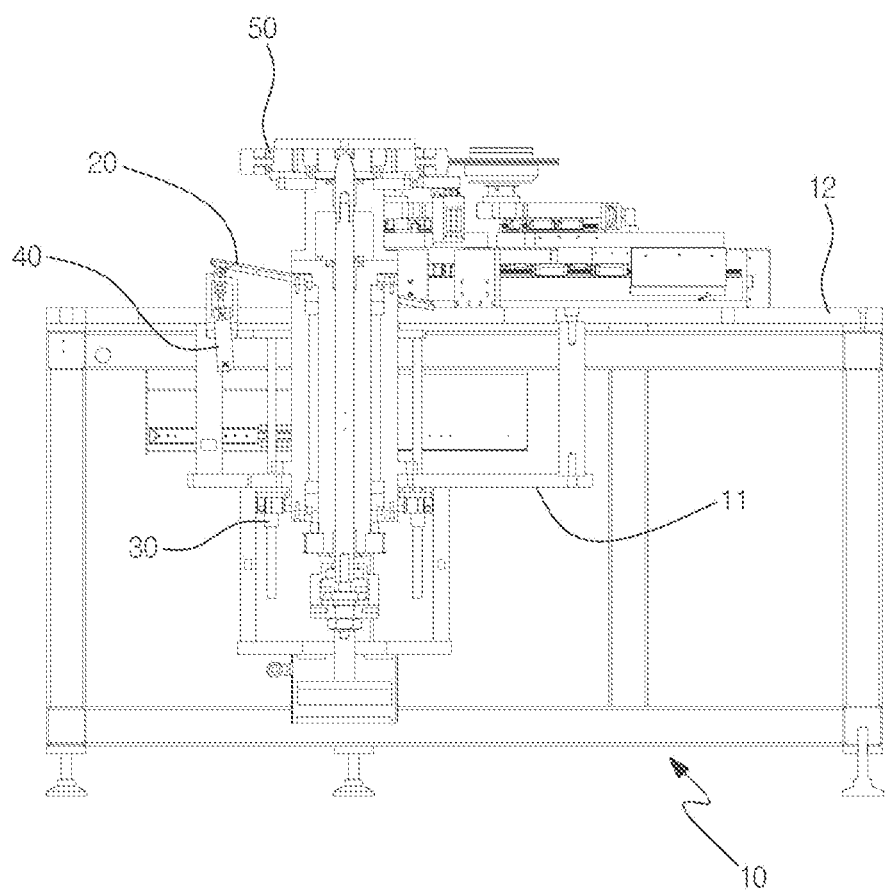
FIG. 8 is a side cross-section view of a device for forming seam of elbow duct of the present disclosure.
Figure 9:
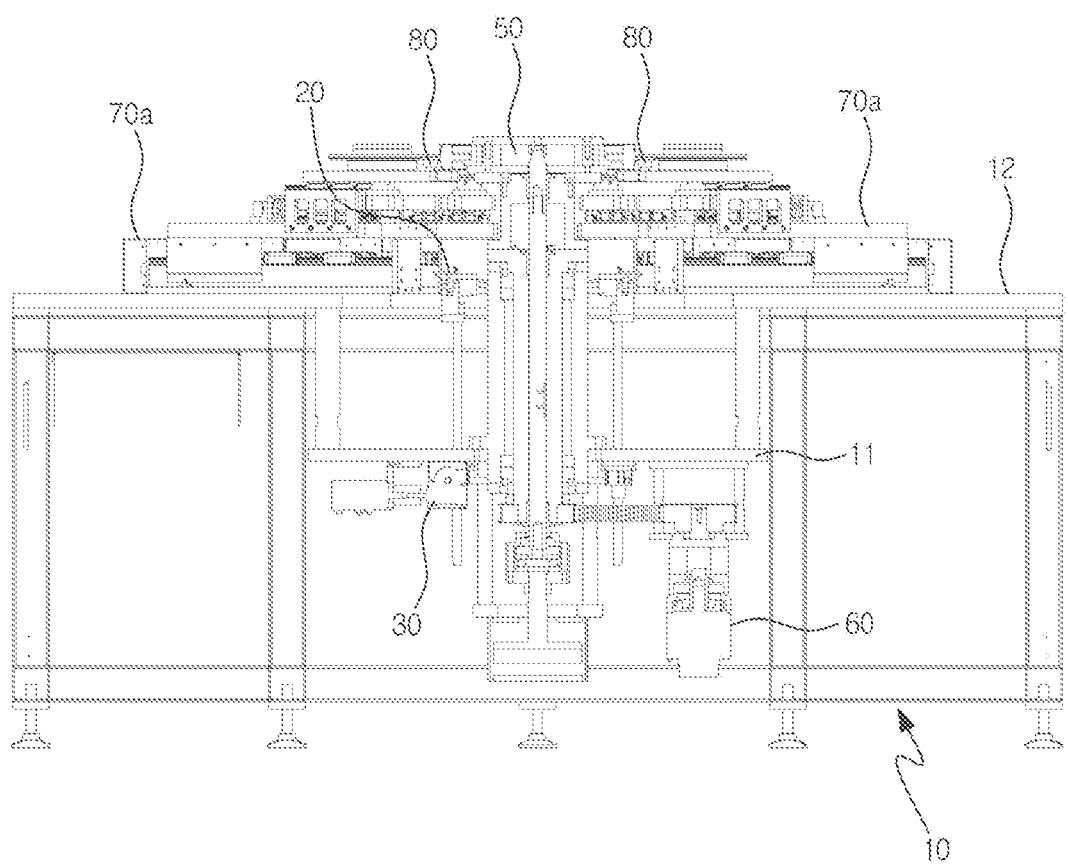
FIG. 9 is a front cross-section view of a device for forming seam of elbow duct of the present disclosure.

Of the attached drawings, FIG. 7 is a plane view of a device for forming seam of elbow duct of the present disclosure, FIG. 8 is a side cross-section view of a device for forming seam of elbow duct of the present disclosure, and FIG. 9 is a front cross-section view of a device for forming seam of elbow duct of the present disclosure.

As illustrated in FIGS. 7 to 9, the base 20 may elevate in a vertical direction on the first table 11 of the device main body 10 by the elevating part 30, and by the angle adjustment part 40 disposed between the base 20 and the elevating part 30, a supporting angle of the base 20 that supports a lower portion of the lower unit member Da may be adjusted.

The fixing chuck 50 penetrates through a center of the base 20 and is disposed in a vertical direction, and is supported in an axially rotatable state on the second table, and an upper end of the fixing chuck 50 selectively supports the inner circumferential surface of the connecting portion of the one pair of unit members Da and Db at an upper side of the base 20, thereby fixing or releasing the fixation of the one pair of unit members Da and Db, and a lower end of the fixing chuck may be connected to the rotating part 60 to receive the driving force for an axial rotation.

The first forming part 70a, the second forming part 70b and the third forming part 70c constituting the forming part are radially disposed around the fixing chuck 50 on the second table 12 of the device main body 10, and the first forming part 70a is provided in plurality, and are disposed at both sides of the fixing chuck 50 such that they are distanced from each other having the second forming part 70b and the third forming part 70c therebetween.

The holder 80 is disposed at both sides of the first forming part 70a provided in plurality, and when necessary, the holder 80 can go forward and support the one pair of unit members Da and Db in a rotatable state.

Meanwhile, in this embodiment, it is exemplified that the first flange F1 is provided in ' L ' shape, but when the first flange F1 and the second flange F2 of the one pair of unit members Da and Db are each provided in a state where they are extended in a horizontal direction, the forming part may be further provided with a forming part that can mold the first flange F1 of the lower unit member Da in ' L ' shape prior to the first forming part 70a.

Hereinbelow, a process for forming a lockseam on a connecting portion of one pair of unit members through a device for forming seam of elbow duct of the present disclosure composed as described above will be described.

Figure 10:
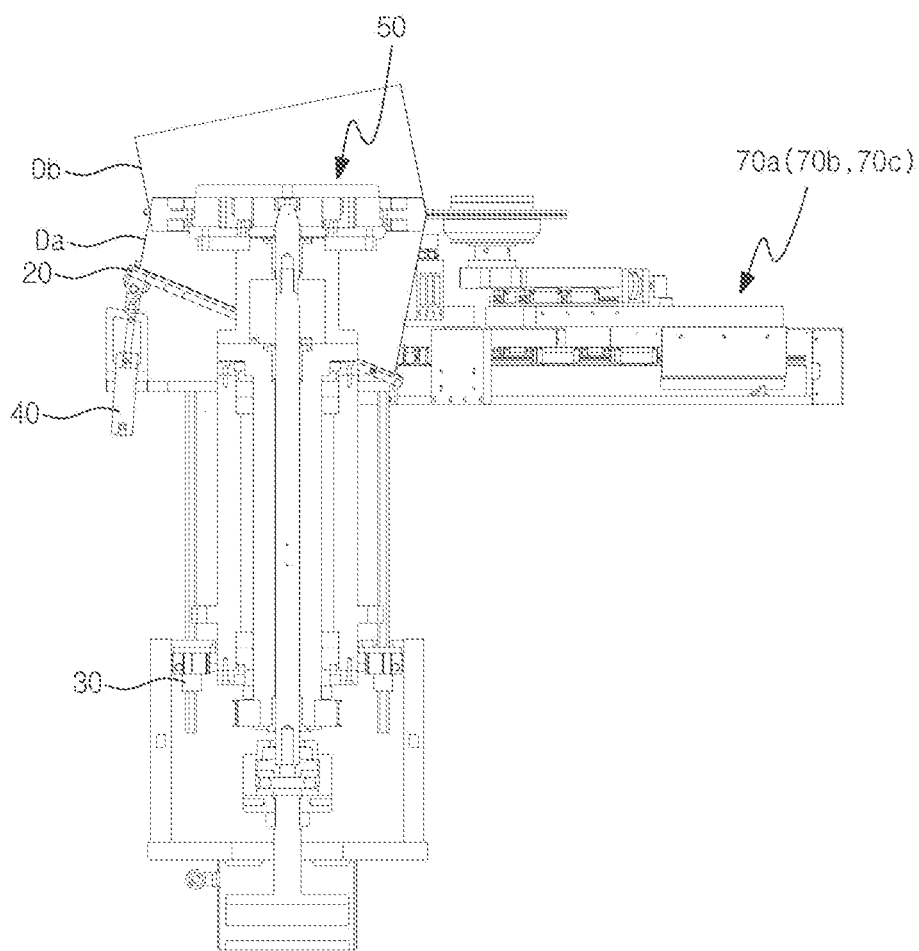
FIG. 10 is a view showing a state in which one pair of unit members are supplied in a device for forming seam of elbow duct of the present disclosure.
Figure 11:
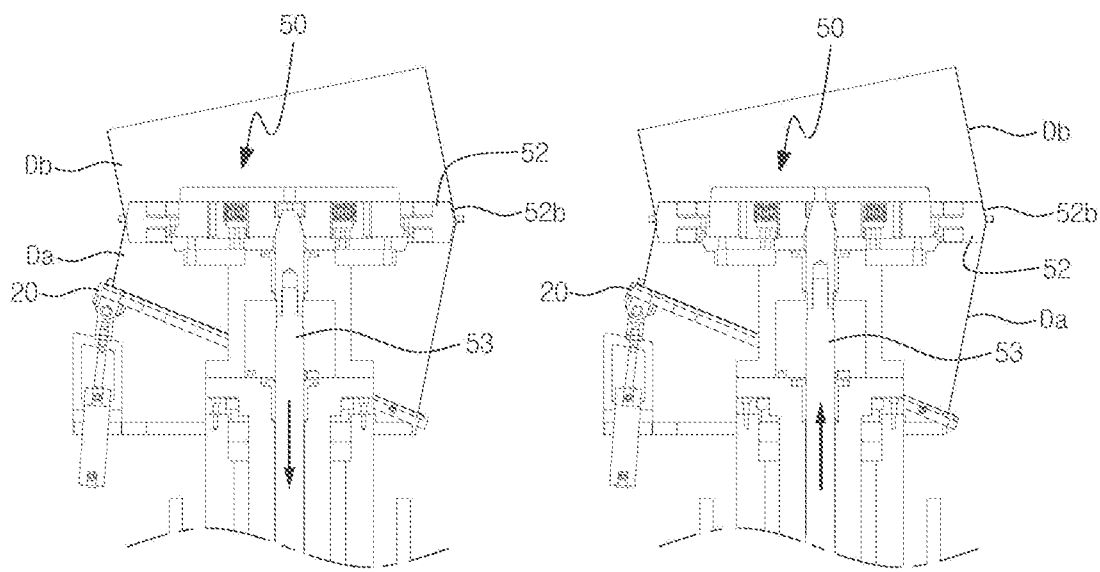
FIG. 11A is a function view of a fixing chuck of a device for forming seam of elbow duct of the present disclosure.
FIG. 11B is function view of a fixing chuck of a device for forming seam of elbow duct of the present disclosure.
Figure 12:
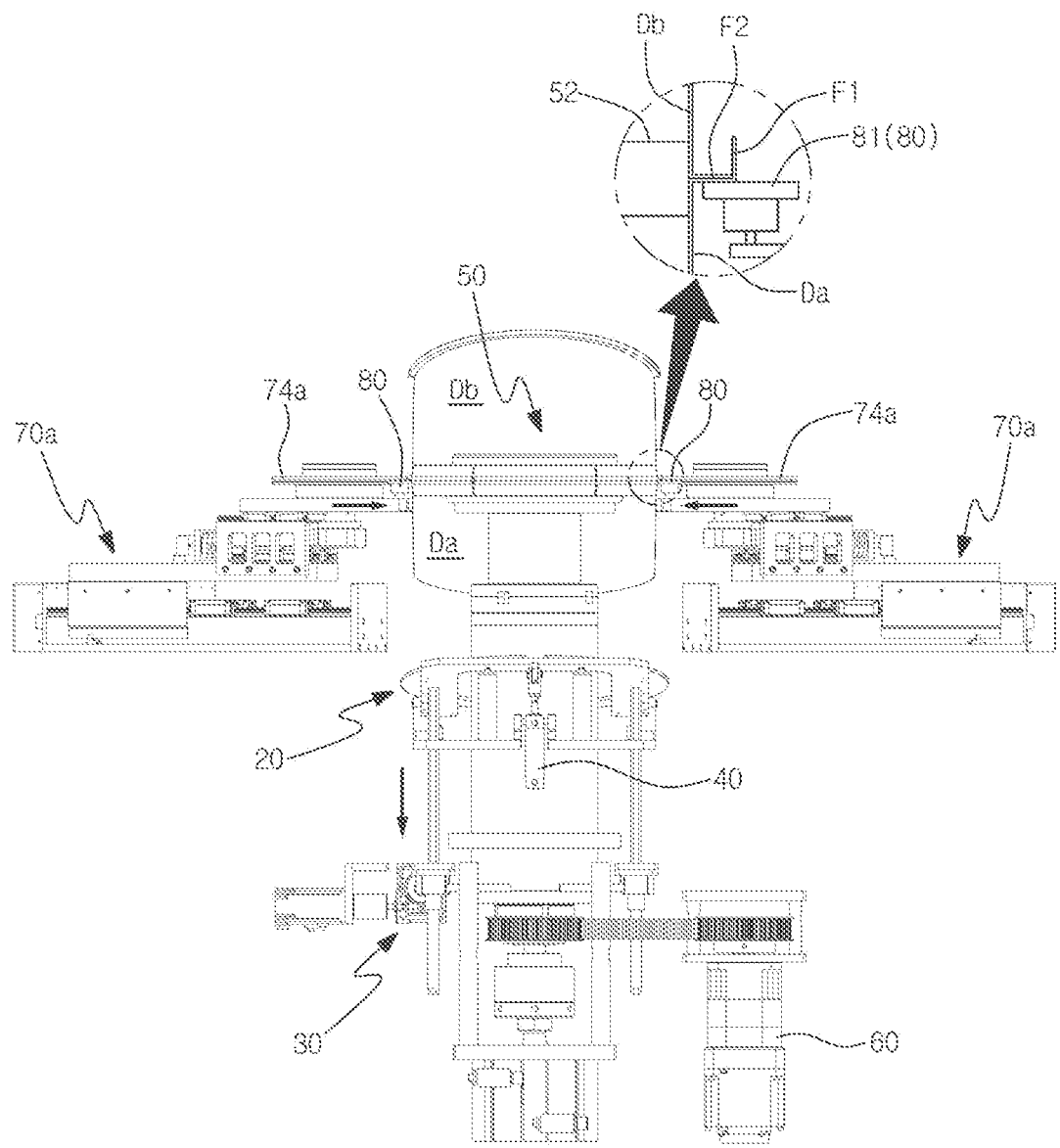
FIG. 12 is a function view of a holder and an elevating part of a device for forming seam of elbow duct of the present disclosure.
Figure 13:
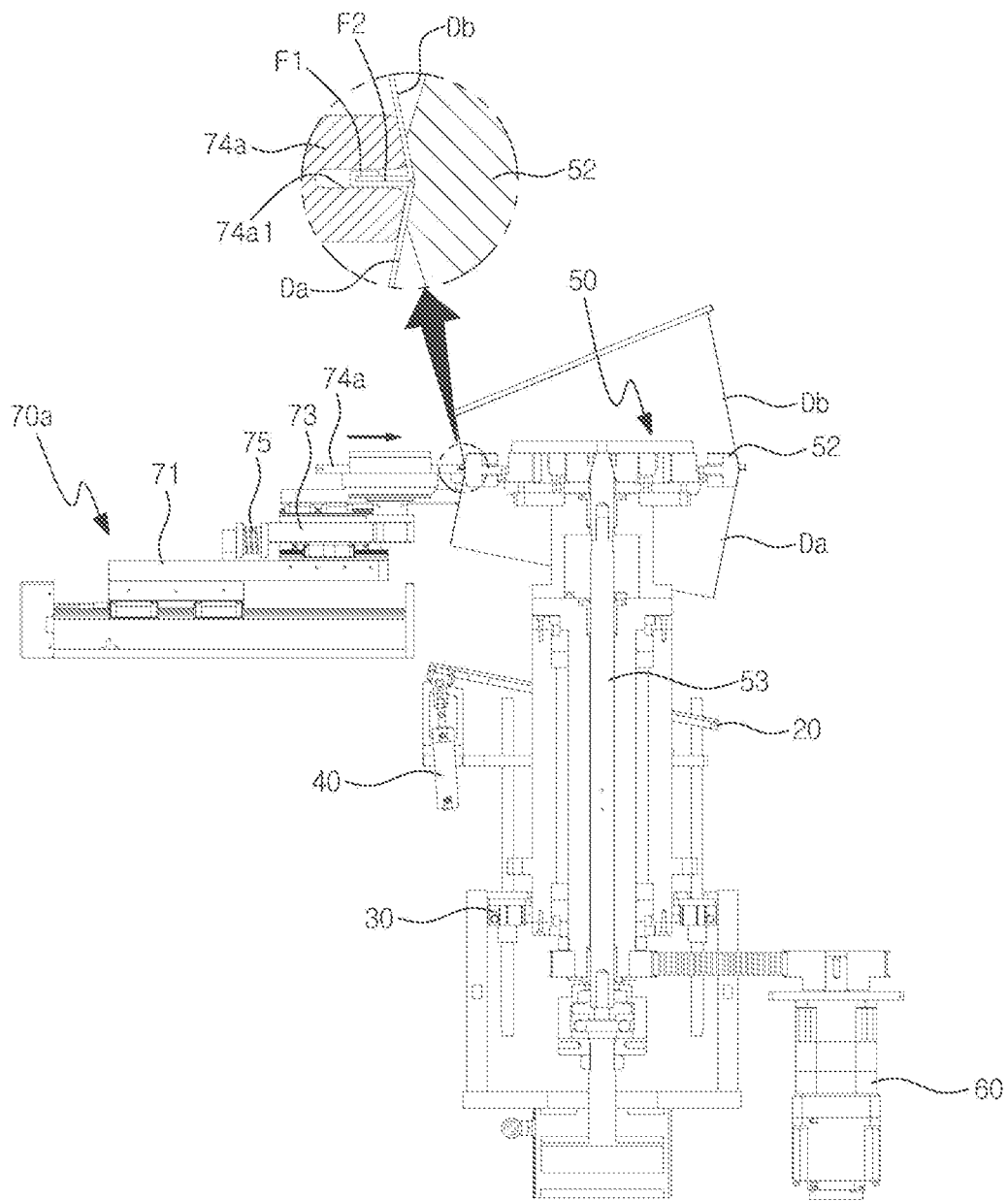
FIG. 13 is a function view showing a forming process of a lockseam by a forming part of a device for forming seam of elbow duct of the present disclosure.
Figure 14:
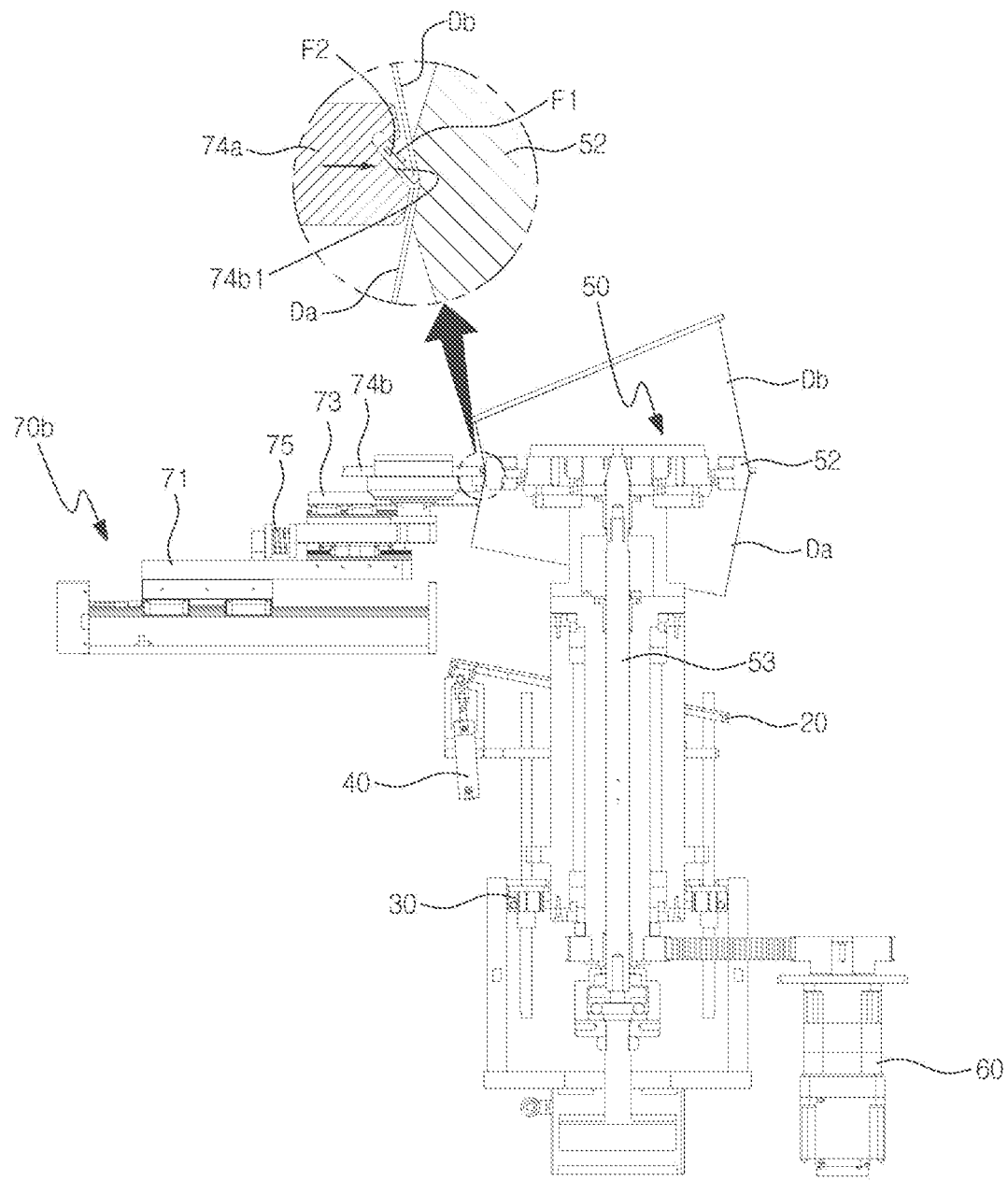
FIG. 14 is a function view showing a forming process of a lockseam by a forming part of a device for forming seam of elbow duct of the present disclosure.
Figure 15:
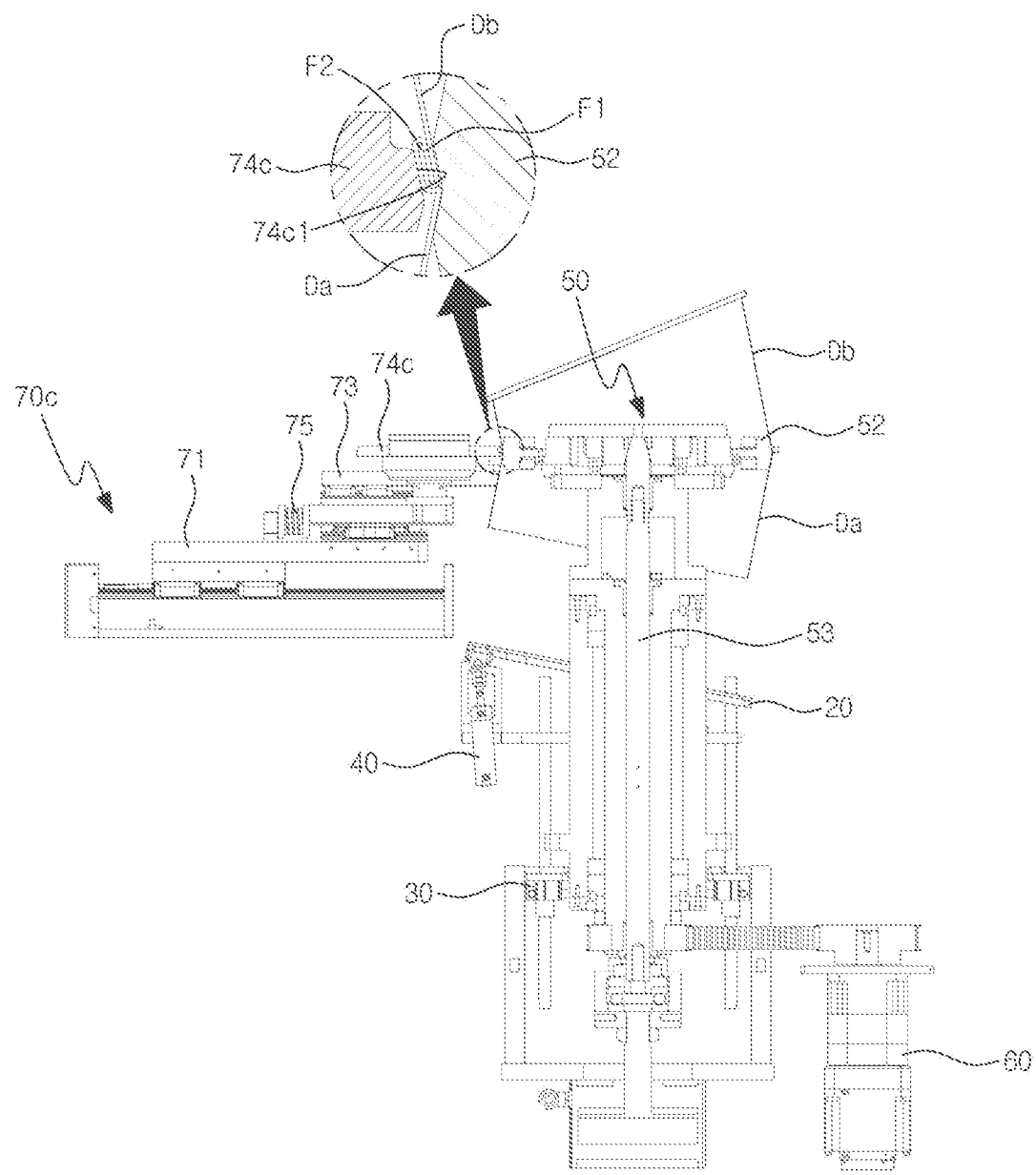
FIG. 15 is a function view showing a forming process of a lockseam by a forming part of a device for forming seam of elbow duct of the present disclosure.

Of the attached drawings, FIG. 10 is a view showing a state in which one pair of unit members are supplied in a device for forming seam of elbow duct of the present disclosure, FIG. 11 is a function view of a fixing chuck of a device for forming seam of elbow duct of the present disclosure, FIG. 12 is a function view of a holder and an elevating part of a device for forming seam of elbow duct of the present disclosure, FIGS. 13 to 15 are function views showing a forming process of a lockseam by a forming part of a device for forming seam of elbow duct of the present disclosure, and FIG. 16 is a view showing a process of manufacturing an elbow-type duct through a device for forming seam of elbow duct of the present disclosure.

First, as illustrated in FIG. 10, the lower unit member Da, of the one pair of unit members Da and Db that are subject of connection, is seated on the base 20, and then, the upper unit member Db is positioned at an upper side of the lower unit member Da.

Here, the elevating position and supporting angle of the base 20 may each be controlled by the elevating part 30 and the angle adjustment part 40, and accordingly, the connecting portion of the one pair of unit members Da and Db being seated on the base 20 may be positioned in an area between the fixing chuck 50 and the first forming part 70a to the third forming part 70c.

In a state where the one pair of unit members Da and Db are held on the base 20 as described above, the fixing chuck 50 comes to be positioned at an inner side of the connecting portion of the one pair of unit members Da and Db as illustrated in FIG. 11, and in a state where the elevating pin 53 is descended as in (a) of FIG. 11, the plurality of supporting members 52 provided between the cover 54 and the chuck main body 51 of the fixing chuck 50 comes to a contracted state, and thus the supporting surface 52b provided on the outer circumferential surface of the supporting member 52 comes to a distanced state from the inner circumferential surface of the one pair of unit members Da and Db.

Next, when the elevating pin 53 is ascended as in (b) of FIG. 11, as the elevating pin 53 presses an inner end of the supporting member 52, each of the plurality of supporting members 52 comes to move away from a center of the fixing chuck 50, and in this process, the supporting surface 52b provided on the outer circumferential surface of the supporting member 52 may support the inner circumferential surface of the connecting portion of the one pair of unit members Da and Db.

After the one pair of unit members Da and Db are fixed by the fixing chuck 50 as described above, the holder 80 disposed at both sides of the plurality of first forming parts 70a are forwarded to support the lower portion of the flange F1 and F2 of the one pair of unit members Da and Db in a rotatable state as illustrated in FIG. 12, and then the base 20 is descended through the elevating part 30, thereby preventing the base 20 from being interfered when the lower unit member Da rotates.

FIGS. 13 to 15 illustrate the stepwise forming process of a lockseam. First, as in FIG. 13, when the fixing chuck 50 is axially rotated using the rotating part 60, the one pair of unit members Da and Db supported to the fixing chuck 50 rotates together with the fixing chuck 50. When the first forming roller 74a of the forming part is forwarded in such a state, by the first forming surface 74a1 of the first forming roller 74a, the first flange F1 and the second flange F2 of the one pair of unit members Da and Db engage each other and are coupled. That is, in a state where the second flange F2 of ' ⌐ ' shape is seated on an upper side of the first flange F1 of ' L ' shape, as an end extended in a vertical direction of the first flange F1 is bent in a horizontal direction by the first forming surface 74a1 recessed in a horizontal direction on an outer circumferential surface of the first forming roller 74a, and thus closely contacted to the upper side of the second flange F2, a form of a standing seam in which the first flange F1 surrounds the lower surface and upper surface of the second flange F2 is made. After the aforementioned primary forming is completed, the moving part 71 is moved backwards through the forward and backward driving part 72 of the forming part, thus distancing the first forming roller 74a away from the one pair of unit members Da and Db.

Next, in a state where the one pair of unit members Da and Db are rotating as in FIG. 14, when the second forming roller 74b is moved forward through the forward and backward driving part 72 of the forming part, as the second forming surface 74b1 formed in an inclined direction on the outer circumferential surface of the second forming roller 74b presses the flange F1 and F2 having the seam form in an upper side direction, the flange F1 and F2 is disposed to be inclined in the upper side direction.

Next, in a state where the one pair of unit members Da and Db are rotating as in FIG. 15, when the third forming roller 74c is moved forward through the forward and backward driving part 72 of the forming part, as the forming surface formed on the outer circumferential surface of the third forming roller 74c presses and closely contacts the flange F1 and F2 disposed to be inclined in the upper side direction towards the outer circumferential surface of the upper unit member Db, the flange F1 and F2 comes to make a lockseam form.

In the process of forming the flange F1 and F2 in a lockseam form using the first forming roller 74a, the second forming roller 74b and the third forming roller 74c, the inner circumferential surface of the one pair of unit members Da and Db is supported by the fixing chuck 50, and thus a smooth forming of the flange F1 and F2 is possible, and the connecting portion of the one pair of unit members Da and Db can be prevented from being damaged by the forming pressure.

Meanwhile, such a process of connecting the one pair of unit members Da and Db may be repeated numerous times to complete an elbow duct. FIG. 16 shows a process of manufacturing an elbow duct by connecting the plurality of unit members D1, D2, D3, D4 and D5. In this embodiment, it is exemplified that the elbow duct consists of five unit members, but there is no limitation thereto.

First, as in (a) of FIG. 16, after the second unit member D2 is positioned on the base 20, and the first unit member D1 is positioned at an upper side of the second unit member D2, the first unit member D1 and the second unit member D2 are coupled using the forming part. Next, the second unit member D2 seated on the base 20 is separated, and the third unit member D3 is positioned as in (b) of FIG. 16, and then the third unit member D3 and the second unit member D2 are coupled, and the third unit member D3 seated on the base 20 is separated, and then after the fourth unit member D4 is positioned as in (c) of FIG. 16, the fourth unit member D4 and the third unit member D3 are coupled, and the fourth unit member D4 seated on the base 20 is separated, and after the fifth unit member D5 is positioned as in (d) of FIG. 16, the fifth unit member D5 and the fourth unit member D4 are coupled, thereby completing the elbow duct composed of the plurality of unit members D1, D2, D3, D4 and D5.

Here, a surface of the plurality of unit members D1, D2, D3, D4 and D5 constituting the elbow duct, that is connected to an adjacent unit member comes to have a predetermined inclination with respect to the central axis, and an outer surface of the end unit members that are positioned at both ends of the elbow duct, that is, the outer surface of the first unit member D1 and the fifth unit member D5 are set to be perpendicular to the central axis to be connected to another duct.

That is, since the connecting portion of the one pair of unit members Da and Db is coupled to the forming part in a state where it is disposed in a horizontal direction and supported by the fixing chuck 50, when the second unit member D2, the third unit member D3 and the fourth unit member D4 are disposed as the lower unit member Da as in (a), (b) and (c) of FIG. 16, the base 20 supports the lower unit member Da ito a first supporting angle a1, and when the fifth unit member D5 is disposed as the lower unit member Da as in (d) of FIG. 16, the base 20 supports the lower unit member Da to a second supporting angle a2.

Such supporting angles of the base 20 are adjusted by the angle adjustment part 40. Specifically, as in (a) to (c) of FIG. 16, the base 20 is rotatably supported around the rotation axis 41 on the elevating table 31, and a functioning load is connected to the base 20, that extends/contracts in a state where the driving part 42 is supported to the elevating table 31. In this state, when the driving part 42 drives in a contraction direction, the base 20 rotates in one direction around the rotation axis 41, and thus the inclination of the base 20 may be adjusted to the first supporting angle. Here, as the first stopper 43 provided on the elevating table 31 supports a lower portion at one side of the base 20, the position of the base 20 with respect to the first supporting angle can be guided.

Meanwhile, when the driving part 52 drives in an extending direction as in (d) of FIG. 16, the base 20 rotates in the other direction around the rotation axis 41, and thus the inclination of the base 20 can be adjusted to the second supporting angle. Here, the second stopper 44 provided on the elevating table 31 supports a lower portion at the other side of the base 20, and thus the position of the base 20 with respect to the second supporting angle can also be guided.

According to this embodiment described above, a lockseam can be easily formed on a connecting portion of a plurality of unit members constituting an elbow duct, and by forming the lockseam in a state where an inner circumferential surface of the connecting portion is supported by the fixing chuck 50, it is possible to prevent the shape of the connecting portion from being deformed during the forming process of the lockseam.

Although the present invention has been disclosed in the form of embodiments and variations thereon, it will be understood that numerous additional modifications and variations could be made thereto without departing from the scope of the invention.

For the sake of clarity, it is to be understood that the use of 'a' or 'an' throughout this application does not exclude a plurality, and 'comprising' does not exclude other steps or elements.

What is claimed is:

1. A device for forming seam of elbow duct, that molds a lockseam by bending a flange of one pair of adjacent unit members among a plurality of unit members constituting the elbow duct, wherein the device comprises:
    a base that supports a lower portion of the one pair of unit members;
    an elevating part that moves the base up and down;
    an angle adjustment part that adjusts a supporting angle of the base;
    a fixing chuck that supports an inner circumferential surface of a connecting portion of the one pair of unit members;
    a rotating part that rotates the fixing chuck; and
    a forming part that bends the flange of the one pair of unit members in a state where the flange is in contact to each other, to form the seam.

2. The device for forming seam of elbow duct, according to claim 1, wherein the elevating part comprises an elevating table that supports a lower portion of the base and an elevation driving part that moves the elevating table up and down.

3. The device for forming seam of elbow duct, according to claim 2, wherein the elevation driving part comprises a plurality of elevating shafts that are disposed to be parallel with a movement direction of the elevating table and that are fixed to a lower portion of the elevating table; a connecting shaft that is disposed in a direction intersecting the elevating shaft and that connects one pair of adjacent elevating shafts; and a driving motor for elevation that provides a rotation driving force to the connecting shaft, wherein a rack and a pinion are formed on a connecting portion of the connecting shaft and the elevating shaft, so that an axial direction position of the elevating shaft is adjusted by an axial rotation of the connecting shaft.

4. The device for forming seam of elbow duct, according to claim 2, wherein the angle adjustment part comprises a rotation axis that rotatably connects the elevating table and the base; and an interval adjustment part that connects the elevating table and one side of the base in a position distanced from the rotation axis, and that adjusts an interval between the elevating table and the base to adjust an angle of the base.

5. The device for forming seam of elbow duct, according to claim 1, wherein the fixing chuck comprises a chuck main body and a plurality of supporting members each of which is moveably disposed radially on the chuck main body, and on an outer circumferential surface of the supporting member, a supporting surface is formed that supports an inner circumferential surface of the connecting portion of the one pair of unit members.

6. The device for forming seam of elbow duct, according to claim 5, wherein the supporting surface is made in a shape corresponding to the inner circumferential surface of the connection portion of the one pair of unit members.

7. The device for forming seam of elbow duct, according to claim 6, wherein the supporting surface is assembled to be attachable/detachable on the supporting member.

8. The device for forming seam of elbow duct, according to claim 5, wherein the fixing chuck further comprising an elevating pin that is elevatably disposed at a center of the plurality of supporting members and that moves the supporting member in an expanding direction according to an elevation position.

9. The device for forming seam of elbow duct, according to claim 8, wherein the fixing chuck further comprising a spring member that is provided between the supporting member and the chuck main body and that elastically supports the supporting member in a contraction direction.

10. The device for forming seam of elbow duct, according to claim 5, wherein, on a plane surface of the supporting member, a guide groove is provided along a movement direction, and on an upper surface of the chuck main body, a guide projection is formed, to be inserted into the guide groove.

11. The device for forming seam of elbow duct, according to claim 1, wherein the forming part comprises a moving part that is disposed to be moveable in a direction approaching towards or distancing away from a center of the fixing chuck, outside of the connecting portion of the one pair of unit members; a forward and backward driving part that moves the moving part forward and backward; and a forming roller that moves forward and backward together with the moving part on the moving part and that is supported to be axially rotatable.

12. The device for forming seam of elbow duct, according to claim 11, wherein the forming part further comprising a roller bracket that is disposed to be movable in a direction parallel with a movement direction of the moving part on the moving part in a state of supporting the forming roller; and an elastic member that is interposed between the moving part and the roller bracket and that elastically supports the roller bracket in a forward direction.

13. The device for forming seam of elbow duct, according to claim 11, wherein the forming part comprises a first forming part, a second forming part and a third forming part, that are disposed in plurality radially around the fixing chuck, the forming roller of the first forming part comprises a first forming surface that forms a standing seam by bending an end of a first flange in a state where the first flange having ' — ' shape formed on a lower side edge of an upper unit member is seated on an upper side of a second flange having ' L ' shape formed on an upper side edge of a lower unit member, the forming roller of the second forming part comprises a second forming surface that bends the seam formed by the first forming part and disposed in a horizontal direction to be inclined towards an outer surface of the duct, and the forming roller of the third forming part comprises a third forming surface that places the seam bent by the second forming part closely to the outer surface of the duct, to form a lock seam.

14. The device for forming seam of elbow duct, according to claim 13, further comprising a holder that rotatably supports the one pair of unit members.

15. The device for forming seam of elbow duct, according to claim 14, wherein the holder is disposed on the moving part of the forming part, and disposed to be able to go forward and backward in a direction towards the fixing chuck on the moving part.

16. The device for forming seam of elbow duct, according to claim 15, wherein a roller is disposed on a front end of the holder.

* * * * *